Patented Mar. 29, 1938

2,112,777

UNITED STATES PATENT OFFICE

2,112,777

METHOD OF PRODUCING SILICON WARE

Max Hauser, Lausanne, Switzerland

No Drawing. Application June 10, 1936, Serial No. 84,585. In Germany June 18, 1935

3 Claims. (Cl. 25—157)

The present invention relates to the manufacture of products of which silicon is an essential constituent. In order to manufacture ceramic or earthenware products containing silicon, either silicon, a silicon alloy or silicide, such as ferro-silicon, is used, in powder or granular form, and is mixed with raw ceramic materials, i. e., clays or fluxes. The bodies thus obtained can be used for lining tiles, pipes and hollow vessels, similar to the stoneware goods in household and industrial use, or these articles may consist wholly of the said bodies. The proportion of silicon present in the body can be varied according to the properties required. It is possible to obtain products of a very high silicon content and only a small percentage of the binding mass. The methods used in the production of these articles are similar to those generally used in the ceramic industry. The products have to be fired.

Silicon materials have great advantages over the ordinary ceramic products, as the former have a high resistance to sudden temperature changes, and especially, a high thermal conductivity, together with a high electrical conductivity under certain conditions. In spite of this it has been observed that the silicon materials obtained up to the present have not produced such good results as were anticipated, owing to the properties of the constituents. Besides which, there are often faults in the manufacture, such as capillary cracks, which take place during the firing process.

There are no fixed rules in manufacturing stoneware as regards the temperature of the firing, the length of time of the process, or the atmosphere of the kiln. Stoneware is generally fired at a temperature of from 1150 to 1250° C., which temperature is reached in from 80–150 hours. Efforts are being made to lower this temperature for reasons of fuel economy. Generally, the firing process takes place in an oxidizing atmosphere. In fireplaces for coal it is practically impossible to ascertain precisely the nature of the atmosphere within the kiln.

I have found that far superior silicon materials are obtained when the process of firing takes place under certain conditions not hitherto employed. I find there are two chief factors which influence the properties of products containing silicon, viz:—the temperature of the firing process, and the composition of the surrounding atmosphere during the firing. These two factors play a surprising part.

With a given body of known silicon content, a product can be obtained with improved properties, especially as regards its thermal and/or electrical conductivity, provided the firing process takes place at 1350° C. or over, instead of at 1250° C.

At a given temperature of firing, a definite composition will produce a product of better qualities especially as regards its thermal or electrical conductivity, if an oxidizing influence on the body being fired can be prevented during the process of firing.

Therefore, the best results are obtained when the atmosphere is kept free from oxygen, and when the firing process takes place at the highest possible temperature, this temperature being limited according to the point of fusion of the silicon, silicon-alloy or silicide present, or by the softening of the body being fired.

There is no difficulty in firing at a sufficiently high temperature. All that is necessary, therefore, is to indicate the means to be applied in order to reduce to a minimum the noxious influence of oxidizing gases during the firing process. This influence is negligible below about 500° C. Besides, the products obtained by the moulding and drying of the body, are so slightly porous as to render the penetration of gases extremely difficult. The harmful influence of the furnace gases can be avoided by reaching vitrification quickly, through decreasing the time of the firing process, to from 10–20 hours, even should the atmosphere contain oxygen.

If large articles, such as receptacles used in the chemical industry, are being fired in furnaces of 50–150 m³ capacity, for example, the firing process takes longer. The influence of an excess of oxygen present in the atmosphere of the furnace has, therefore, to be avoided. In this case, saggars containing carbon may be used, but it is easier to prevent the presence of free oxygen in the atmosphere of the furnace. If coal is employed, it is difficult exactly to gauge the composition of the desired gases, but this is easily done when a gaseous or liquid fuel is used. In this case, the proportion of fuel and air can be regulated so as to obtain complete combustion, and so that the combustion gases produced contain practically no free oxygen.

If non-porous products have been obtained by the firing, then the atmospheric composition during the cooling process is of no importance. If porous products have been obtained, then it is important to keep the atmosphere free of oxygen, even during the cooling down of the furnace.

In the following claims the term "silicon" is intended to cover also silicides and silicon-alloys.

What I claim is:—

1. In the manufacture of articles of ceramic ware of which silicon is an essential constituent, the step of firing the shaped articles between 1250° C. and the softening point of the article, and in an atmosphere practically devoid of oxygen.

2. In the manufacture of articles of ceramic ware of which silicon is an essential constituent, the step of effecting the firing of the shaped articles whilst the action of oxygen is practically eliminated.

3. In the manufacture of porous articles of ceramic ware of which silicon is an essential constituent, the steps of effecting the firing of the shaped articles whilst the action of oxygen is practically eliminated and allowing the articles to cool whilst the action of oxygen is practically eliminated.

MAX HAUSER.